US011521266B2

(12) United States Patent
Beltran-Guerrero et al.

(10) Patent No.: US 11,521,266 B2
(45) Date of Patent: Dec. 6, 2022

(54) SUPPLY AND DEMAND MATCHING WITHIN AN EXCHANGE MARKET FOR ANTICIPATIVE DEMAND FROM EARLY SIGNALS

(71) Applicant: Hitachi, Ltd., Tokyo (JP)

(72) Inventors: Jose Luis Beltran-Guerrero, Mountain View, CA (US); Peng Shouchun, San Jose, CA (US)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 16/990,494

(22) Filed: Aug. 11, 2020

(65) Prior Publication Data

US 2022/0051318 A1     Feb. 17, 2022

(51) Int. Cl.
| | | |
|---|---|---|
| G06Q 10/10 | (2012.01) | |
| G06Q 10/06 | (2012.01) | |
| G06Q 30/00 | (2012.01) | |
| G06Q 10/04 | (2012.01) | |
| G06Q 50/02 | (2012.01) | |
| G06Q 10/08 | (2012.01) | |
| G06Q 40/04 | (2012.01) | |
| G06N 5/04 | (2006.01) | |

(52) U.S. Cl.
CPC ............. *G06Q 40/04* (2013.01); *G06N 5/04* (2013.01); *G06Q 10/04* (2013.01); *G06Q 10/06313* (2013.01); *G06Q 10/06375* (2013.01); *G06Q 10/087* (2013.01); *G06Q 10/10* (2013.01); *G06Q 30/018* (2013.01); *G06Q 50/02* (2013.01)

(58) Field of Classification Search
None
See application file for complete search history.

(56) References Cited

U.S. PATENT DOCUMENTS

| | | | |
|---|---|---|---|
| 6,612,382 B2 * | 9/2003 | King | E21B 44/005 |
| | | | 702/9 |
| 2002/0099578 A1 * | 7/2002 | Eicher, Jr. | G06Q 10/06393 |
| | | | 705/7.39 |
| 2003/0074284 A1 | 4/2003 | Bowden | |

(Continued)

FOREIGN PATENT DOCUMENTS

| | | | |
|---|---|---|---|
| CA | 2369669 A1 * | 9/2002 | |
| WO | WO2003034178 A2 * | 4/2003 | |
| WO | WO 2021051141 A1 * | 3/2021 | |

OTHER PUBLICATIONS

Chima CM, Supply-chain management issues in the oil and gas industry, Journal of Business and Economics Research, JBER, 5-6, Jun. 1, 2007 https://www.clutejournals.com/index.php/JBER/article/view/2552 (Year: 2007).*

*Primary Examiner* — Octavian Rotaru
(74) *Attorney, Agent, or Firm* — Propcopio, Cory, Hargreaves & Savitch, LLP

(57) ABSTRACT

Example implementations involve a mechanism of distribution of products and services, which may have early signals of demand when such products are consumed by project based activities. By offering flexible demand and supply matching, an analytics engine platform predicts such demand, and constructs micro-contracts to match suppliers with project operators, anticipating their demand needs. The mechanisms can be applied to distribution of any kind of products or services in a supply chain which demand arises by planned projects.

9 Claims, 17 Drawing Sheets

(56) References Cited

U.S. PATENT DOCUMENTS

| | | | |
|---|---|---|---|
| 2006/0036531 A1* | 2/2006 | Jackson | G06Q 20/042 705/37 |
| 2007/0043602 A1* | 2/2007 | Ettl | G06Q 10/06311 705/7.22 |
| 2012/0330690 A1* | 12/2012 | Goslinga | G06Q 40/00 705/4 |
| 2014/0006075 A1* | 1/2014 | Shoshan | G06Q 10/063112 705/7.14 |
| 2019/0340590 A1* | 11/2019 | Davey | G06Q 20/02 |
| 2021/0224913 A1* | 7/2021 | Tapia | G06Q 40/02 |

* cited by examiner

SUPPLY AND DEMAND MATCHING WITHIN AN EXCHANGE MARKET FOR ANTICIPATIVE DEMAND FROM EARLY SIGNALS

BACKGROUND

Field

The present disclosure is generally directed to an exchange platform, and more specifically, to an exchange platform directed to facilitate an exchange market involving anticipated demand from early signals.

Related Art

In the related art, distribution of products is based on forecasting and planning inventory to fulfill demand. Understocking products normally results in a backlog if the underlying consumption is delayed, or else is treated as lost sales if buyers deem them to be critical and required on demand. When customers downstream the supply chain use the products as part of a project, such as construction or well drilling activities, such product or material shortages would affect activities in the critical path or stop production. Measuring shortage these costs are often too complex to estimate when the required data and information is deemed sensitive and confidential between seller and buyer.

Traditional business models in supply chain between buyers and sellers include some of the following characteristics. Industrial buyers of products and services are driven by project-based activities and consume their products based on milestones. Agents or inventory managers build data systems to store history of sales and procured products. Forecasting of sales, procurement and inventory planning determine planned inventory levels to prepare a planning horizon to meet sales. To minimize risks of shortages, the main recourse is to increase stocks.

Normally, execution and planning leads to costly gaps, and most managers are risk averse to lost sales, thereby creating large amounts of inventory which is also subject to the risks of obsolescence, deterioration, expiration, shelf life issues, and other risks of over-age.

In Oil and Gas (O&G) drilling, for example, operators (e.g., the customers) construct wells to produce oil and gas in the upstream system, from extraction to distribution. Tubular products are the main products to build wells, and are supplied and distributed along other services through contracts along the supply chain, from steel factories, to mills, to distributors, to operators (drillers). In the final phase, the OCTG (oil county tubular group product) suppliers distribute products to drilling operators (customers) in a traditional channel. Planning the inventory of OCTG products relies on long term contracts between companies in each step of the supply chain. Routine purchase orders must comply to such contracts.

However complex the contracts obligations are, abiding to them in each purchase order delivery skirts the risk of sharing sensitive information as of how they are needed, and depend on large amounts of stock and accurate data systems. Thus, every player in the supply chain develops information technology (IT) data systems to store their data elements, such as sales history, purchase orders, stock levels, requirements, etc., which is used to build their planning models of forecasting, procurement, inventory, sales activities, and others business tasks.

These types of systems have led to the traditional distribution processes requiring capacity investments, use of standard inventory planning processes, and reactively fulfilling demand as it is triggered by a regular "sales order".

The related art distribution business model and sales process, as in the OCTG example, requires distributors to chase demand, and pulls supply by building large stocks of inventory to satisfy demand (e.g., from quantities to service conditions), and to meet order fulfillment in a timely manner. This can be important in project based demand usage or consumption. A key element in distribution systems is that demand materializes close to the product usage at specific milestones of the construction project, and in the case of industrial distribution of products, at the start of project constructions (well drilling). In this domain, it is often a contractual obligation to ensure the supplier to meet 100% service levels at the pre-specified milestone. In the case of OCTG it is the spud date, or the date when the ground is cleaned to begin drilling.

In a related art implementation, the sales process depends on large contracts negotiated ex-ante and requires commitments of stocking inventory of large quantities of material to ready shipments, since manufacturing of such products have large lead times, and shortage costs are steep and prohibitive (e.g., it disrupts construction equipment, multiple crews, and rigs must follow tight schedules).

SUMMARY

To improve forecast demand, supply chain partners try the scheme of information sharing, in which operators, for instance in Oil and Gas, are required to share information of drilling projects as construction date approaches. Oftentimes, the shared plans are vague, due to challenges of coordination and communication, uncertainty of scheduling, confidential information, permits authorization, and so on. The related art contract agreements aim at achieving a volume between signing suppliers and operators, or between mills and suppliers, but information flow is still limited. Operators trigger the purchase orders (PO) to suppliers within contracts by specifying a deterministic shipping date, product specs, quantities, and ancillary services.

The related art system and method to distribute (buy/sell) in project based markets, such as in OCTG, creates several problems and it limits sellers to buy from suppliers, as well as suppliers to sell to buyers, from binding or committed contractual agreements, or the vested interests in focusing on contractual partners. Such related art systems create both risks to suppliers and buyers, and is reflected on inventory risks and investments risks. Thus, the related art systems create inefficiencies, lack flexibility, and create a burden of information sharing.

Under such level of uncertainty and complexity, along with the continual economic changes of the industry, prediction of demand and inventory planning must require larger inventory safety stocks, leading to larger capacity, fixed costs, and other challenges. Hence, the competition becomes entrenched, driving down efficiencies and quality of service.

Example implementations described herein are directed to facilitating a platform involving new methods and a mechanism of distribution of products and services, which may have early signals of demand when such products are consumed by project-based activities. By offering flexible demand and supply matching, example implementations described herein involve an analytics engine platform to predict early such a demand, and which is configured to construct micro-contracts to match suppliers (or vendors) with project operators (customers), through anticipating customer demand needs. The example implementations described herein can be applied to distribution of any kind of products or services in a supply chain in which demand depends on "project" plans. Example implementations described herein are presented with the O&G drilling example, and applied to tubular products used with new wells drilling, but can be extended to other types of supplier micro-contracts in accordance with the desired implementation. Early signals of demand arise from drilling and construction permits, used to anticipate consumption events. The Supply and Demand Matching algorithm described herein uses probabilistic demand events, from early signals, as well as deterministic purchase orders or call outs.

Aspects of the present disclosure involve a computer-implemented method, which can involve continually monitoring a database, and or crawling web-data syndicated data sources, including supplier information associated with one or more suppliers and operator information associated with operator permits or intent to constructions (e.g. drilling permits in O&G example.) A data analytics engine creating a trigger indicative of a prediction that a demand for a micro-contract for the operator exceeds a threshold; generating predictions of parameters of the micro-contract for transmission to the one or more suppliers over a network; for an acceptance received from at least a subset of the one or more suppliers, selecting a supplier from the subset of the one or more suppliers, and generating the micro-contract for the operator from the parameters; and for an acceptance received from the operator over the network, executing the micro-contract between the operator and the seller.

Aspects of the present disclosure further involve a non-transitory computer readable medium, storing instructions for executing a process, the instructions involving monitoring a database comprising supplier information associated with one or more suppliers and operator information associated with an operator until a trigger is detected, the trigger indicative of a prediction that a demand for a micro-contract for the operator exceeds a threshold; generating predictions of parameters of the micro-contract for transmission to the one or more suppliers over a network; for an acceptance received from at least a subset of the one or more suppliers, selecting a supplier from the subset of the one or more suppliers, and generating the micro-contract for the operator from the parameters; and for an acceptance received from the operator over the network, executing the micro-contract between the operator and the seller.

Aspects of the present disclosure further involve an apparatus, which can include a processor, configured to monitor a database including supplier information associated with one or more suppliers and operator information associated with an operator until a trigger is detected, the trigger indicative of a prediction that a demand for a micro-contract for the operator exceeds a threshold; generate predictions of parameters of the micro-contract for transmission to the one or more suppliers over a network; for an acceptance received from at least a subset of the one or more suppliers, select a supplier from the subset of the one or more suppliers, and generating the micro-contract for the operator from the parameters; and for an acceptance received from the operator over the network, execute the micro-contract between the operator and the seller.

Aspects of the present disclosure further involve a system involving means for monitoring a database including supplier information associated with one or more suppliers and operator information associated with an operator until a trigger is detected, the trigger indicative of a prediction that a demand for a micro-contract for the operator exceeds a threshold; means for generating predictions of parameters of the micro-contract for transmission to the one or more suppliers over a network; for an acceptance received from at least a subset of the one or more suppliers, means for selecting a supplier from the subset of the one or more suppliers, and means for generating the micro-contract for the operator from the parameters; and for an acceptance received from the operator over the network, executing the micro-contract between the operator and the seller.

DETAILED DESCRIPTION

Figure 1:
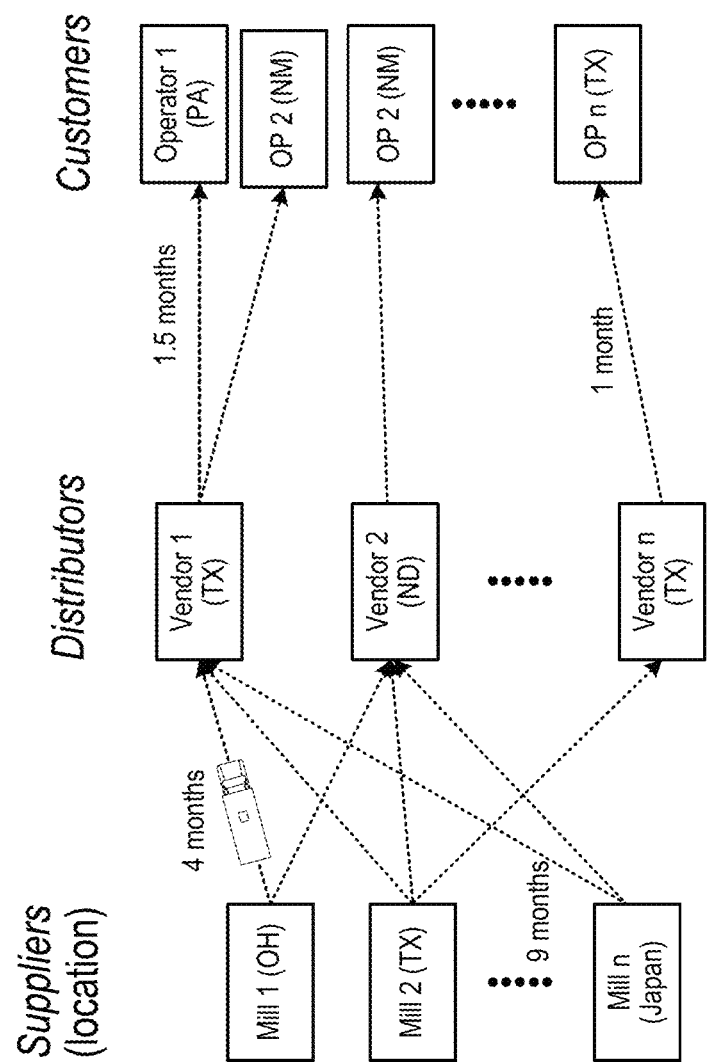
FIG. 1 illustrates an example distribution system.

The following detailed description provides details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

Example implementations involve a mechanism of distribution of products and services, which may have early signals of demand when such products are consumed by project based activities. By offering flexible demand and supply matching, an analytics engine platform predicts such demand, and constructs micro-contracts to match suppliers with project operators, anticipating their demand needs. The mechanisms can be applied to distribution of any kind of products or services in a supply chain which demand arises by planned projects. The notation in the present disclosure is presented with the oil and gas drilling example, and applied to tubular products used with new well drilling. Early signals of demand arise from drilling and construction permits, which are used to anticipate consumption events. The Supply and Demand Matching algorithm uses probabilistic demand events, as well as deterministic demand call outs. The methods of the present disclosure include prediction models, a matching algorithm, and mechanics of the exchange to lock in micro-contracts between participating agents.

FIG. 1 illustrates an example distribution system. Example implementations described herein are directed to addressing risks in the related art systems, which can involve supplier risk in a traditional distribution system, supply chain efficiency which is heavily dependent on mid and long range forecasting due to demand changes, and additional complex issues from multiple customers members who may be reluctant to share confidential plans, or send biased plans brings planning trust issues. Further, other risks can include industrial suppliers depending on small number of buyers which leads to a lesser inventory risk pooling and large forecasting error.

Products manufactured incur an added lead time, including transportation time if imported. The lead times cascade into the upstream supply chain from suppliers of mills such as steel companies producing specialized steel, which are often make to order. Having a large safety stock of inventory increases spoilage risk and obsolescence. Further there are costs in tracking products in yard (e.g., steel pipes lack serial number of reliably tagging system).

Example implementations described herein are also directed to addressing buyer risks in distribution systems. Such risks can include disruptions in construction depending on single source availability, the sharing of confidential information, producing sourcing plans and commitments that reduce production flexibility, and dependability of single source limit speed to make planning corrections and adjustments. Further risks can include inflating costs of inefficiency for improving supplier flexibility (e.g., changes in product portfolio, construction start time, and quantities), suppliers fix cost transferred to product prices and supply chain risks. There are ripple effects when buyers depend on supplier capabilities of planning and execution, thus supplier disruptions ripple in the buyer production plans.

Figure 2:
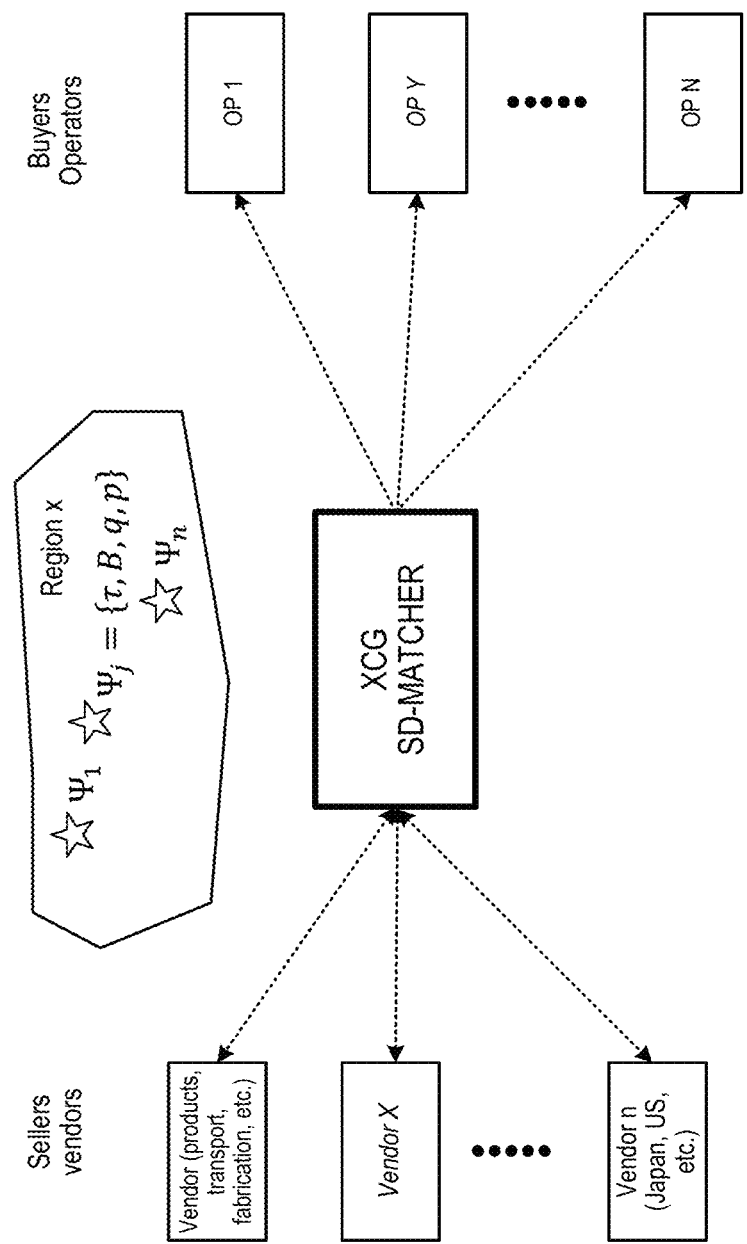
FIGS. 2 and 3 illustrate an example overview of the exchange platform, in accordance with an example implementation.
Figure 3:
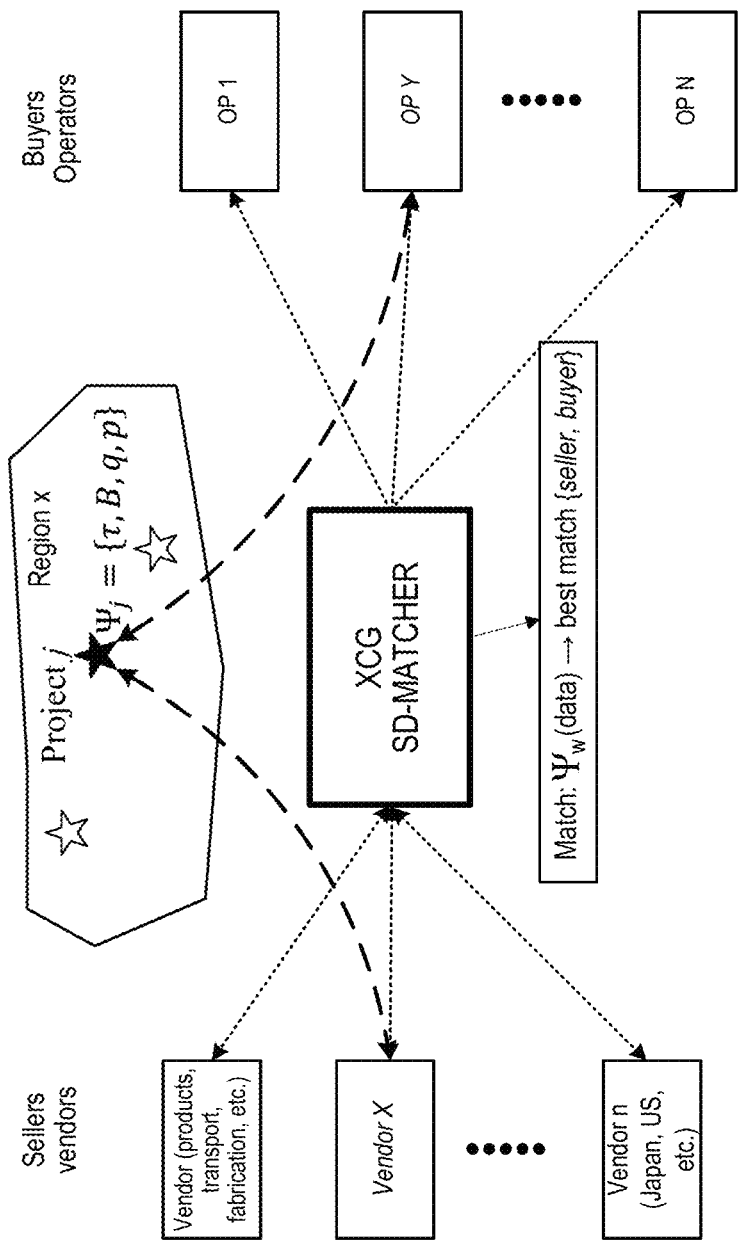

FIGS. 2 and 3 illustrate an example overview of the exchange platform, in accordance with an example implementation. Example implementations described herein involve an exchange platform (XCG) which changes the traditional distribution from highly aggregated to a more granular, anticipative demand fulfillment. The example implementations described herein create a 'demand-supply matching' economy anticipating demand as probabilistic bundle of demand predicted earlier from demand signals, and from intent-based project based signals. The new distribution system is depicted in next graph, first anticipating demand signals, then matching supply-demand (seller-buyer) to form a micro-contract. FIG. 2 illustrates an example of the prediction of demand signals, wherein demand intent prediction is conducted based on the application of permits, surveys, and so on as further described below. FIG. 3 illustrates an example of the demand and supply matching, in which the supply and demand engine in the platform conducts calculations to maximize the likelihood of agreement of micro-contracts.

The example implementations of the XCG, depicted below, to create 'matching' economy on a probabilistic demand from intent based signals.

Figure 4A:
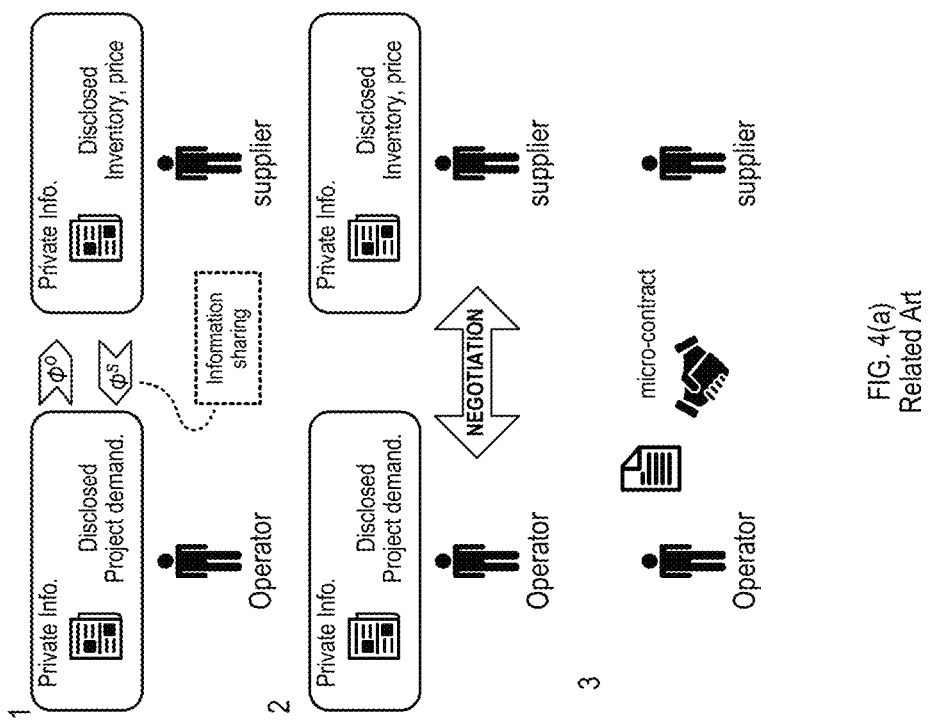
FIGS. 4(a) and 4(b) illustrate examples of agent interactions.
Figure 4B:
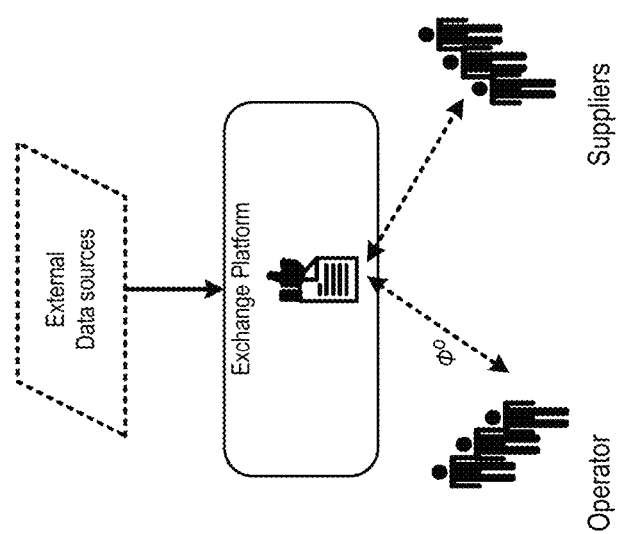

FIGS. 4(a) and 4(b) illustrate examples of agent interactions. Specifically, FIG. 4(a) illustrates the related art approach, whereas FIG. 4(b) illustrates the interactions through the exchange platform. In the related art approach in FIG. 4(a), 1) the operator (buyer) plans a construction project, and shares the data deemed to be appropriate with a supplier (vendor). The disclosure of information is limited to ensure the transaction is carried out, such as whether inventory would be available or not. Then at 2) the parties negotiate prices, quantities, returns, and so on. At 3) the parties reach an agreement and close the deal.

In FIG. 4(b), the example implementations facilitate carrying out such a negotiation in a transparent manner through the exchange platform. Similarly, when agents participate in the platform they share data, or the platform downloads permits and anticipates operator needs. Vendors or suppliers participating in the platform indicate what products they stock in inventory, and thus a best matching algorithm is applied to close the deal, which is considered as a micro-contract. In the platform, the ability to communicate between buyer and sellers is not only standard but more effective.

Example implementations described herein utilize methods to manage a marketplace whereby a distribution of products with early demand signals anticipates demand creation, and constructs micro-contracts between buyers and sellers. Example implementations utilize a distribution model to dynamically adapt distribution to demand signals by applying analytics and methods to timing demand signals based on key milestones (e.g. spud drilling), a market-exchange platform to enable flexible demand/supply matching, to distribute products and services in a hailing mechanism, and milestones based demand signals: from early planning (oil exploration, land leasing and construction permits) to predicting demand consumption time (spud date) to construct a micro-contract matching supply and demand across suppliers and customers (operators).

Figure 5:
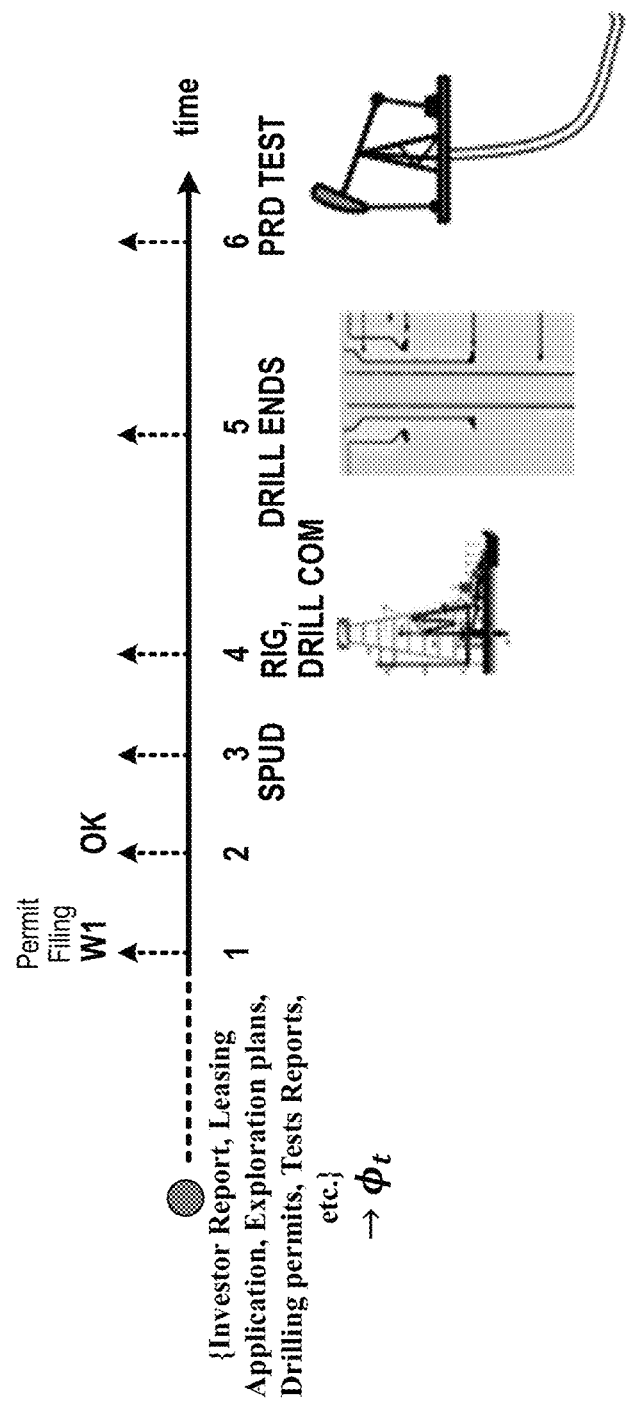
FIG. 5 illustrates an example construction project template.

FIG. 5 illustrates an example construction project template. Most well construction follows the template illustrated in FIG. 5, and leads to a similar Gant chart of activities and milestones to any well construction, often bounded to a permit approval. Other projects follow similar permits and state regulations requiring permits and plans approved by state offices. In this case, specifically applied to drilling wells, there are a set of milestones from inception to demand consumption at milestone 4 and 5. In the well drilling industry, it is often agreed that materials start arriving for consumption at 'Spud Date', when the ground is cleaned and set up to start drilling.

Figure 6A:
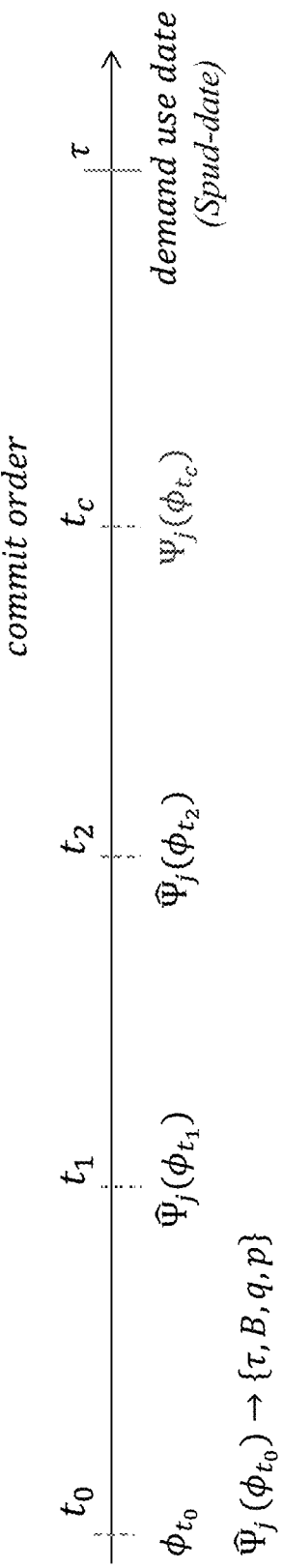
FIG. 6(a) illustrates example timings for the exchange mechanism of the platform, in accordance with an example implementation.

FIG. 6 illustrates example timings for the exchange mechanism of the platform, in accordance with an example implementation. In the example of FIG. 6, analytic-based methods use data ϕ of early signals of demand to predict demand properties ($\hat{\psi}$), which includes the set of products and corresponding quantities (B,q) and key timing τ date points. A matching algorithm between operator and distributors creates a micro-contract, at price p, by matching demand and supply between buyer and seller. Once matched, a transaction follows as managed by an exchange system.

An exchange mechanism follows the micro-contract inception, construction, prediction and commitment in a project based, or milestone based, providing early signals of demand. For example, in the well drilling process, FIG. 6 illustrates the milestone and key epochs upon which example implementations facilitate the mechanism for matching between buyers and sellers to fulfill demand.

In example implementations of the exchange system, the supply and demand matching of anticipative demand based on early signals works as follows. At first, the system monitors signals from Φ, and builds New Demand set $\mathcal{D}$. The example implementations trigger micro-deal pursuit start at $t_0$ upon a detection of a project permit (probabilistic call), detection of a report of a project funding (probabilistic call), a detection of a trigger for a project call out (deterministic call) or when the XCG platform updates information Φ.

Then, the XCG platform predicts the early demand bundle $\hat{\psi}_w$ for every project in $w \in \mathcal{D}$, using Φ. The XCG platform then presents offering $\hat{\psi}_w$ to potential vendors through a process involving optimizing the best matching (pre-select) set of suppliers with best to operator matchings preferences, open the bidding process by sharing offering/potential deals to suppliers, and if there are multiple suppliers bid, take the best bid to operator that maximizes matching rewards, otherwise adjust inputs and parameters of the formulation, denoted by Δ(Φ), and re-optimize $\hat{\psi}_w$ to satisfy new constraints.

Then, the micro-contract is formed and the XCG platform conducts a matching "handshake" or closing a deal on a micro-contract between an operator and a supplier. At first, an offer is extended to an operator. If the demand trigger is generated from the operator, then the offer is expected by the operator. If demand trigger is anticipative, an open offer is contingent on a validating event. Then, if the operator accepts the supply offer, then the demand is matched. Otherwise, the XCG platform adjusts Δ(Φ), and proceeds to re-optimize $\hat{\psi}$ to satisfy new constraints. The XCG platform then constructs the micro-contract contingent on initial parameters (range).

The XCG platform is also configured to conduct dynamic updates by updating epochs $t_1, t_2, \ldots t_c$. The updates can include updating new information for Δ(Φ) while available and updating the bundle $\hat{\psi}$.

At the commitment date, the XCG platform facilitates a process to finalize the offer. The XCG platform finalizes the order, product details, quantities, and the prices within predefined range, thereby finalizing the micro-contract. In an example implementation of a deliver and close through the XCG platform at the delivery date, the supplier ships products through the XCG platform, the XCG platform acknowledges delivery, processes payments to suppliers and closes the micro-contract.

Example implementations also utilize a matching algorithm so that anticipated demand is matched to suppliers (sellers). The example matching algorithm achieves the incentives to participate and both, sources of supply (the vendors or suppliers) to agree on the main elements of demand (from intention or inception) that the operator or customer would require to use in its construction project, well drilling, and so on.

In an example of a demand-supply matching (DSM) micro-contract model, a number of suppliers allocate inventory to be traded in the exchange for a given period t, and are available in different stock locations. These allocations are timely disclosed in the exchange as suppliers indicate what products they are trading.

For the supply side, let $S_V = \{1, 2, \ldots, n_V\}$, be a set of suppliers of products or ancillary services (sellers, vendors, providers, etc.) and let $S = \{1, 2, \ldots, n_S\}$, be an asset of supplier facilities (e.g. warehouses or storage place, fix or mobile) of products with known locations. If it is a crew producer of an ancillary service, its location may be mobile and disclosed in the exchange.

Each supply location is mapped to its vendor or supplier by a vector $s_i$=supplier managing facility i, $i \in S$, $s_i \in S_V$.

A supplier facility has an allocation of inventory of products, and thus is capable of delivering demand to customers to project locations; equivalently, a service crew is capable of producing an ancillary service. A supplier has one or more locations to reach demand where necessary. The allocation is time dependent, so an index t is omitted when dealing with a single period.

For the demand side, a set of operators (e.g. construction companies) manage each a number of projects according to their project plan. Such construction projects (e.g. well-drilling, building-construction, etc.) are developed at different locations in a given region.

Let $D_M = \{1, 2, \ldots, n_M\}$, be a set of operators managing a number of projects and let $\mathcal{D} = \{1, 2, \ldots, n_D\}$, be a set of demand points requiring products or ancillary services for a project located in specific locations. Each project is mapped to its buyer or operator by a vector $b_j$=operator of project j, $j \in \mathcal{D}$, $b_j \in D_M$. be the set of unique product types from all projects demanded.

Micro-Contract Construct Between Supply and Demand

A micro-contract for demand point j at time t includes a minimum set of requirements, defined by $$\psi_j(\Phi_t) = \{\tau_j, B_j, q_j, p_j\}, \text{ with } \tau_j > t, B_j \subset \mathcal{P}, q_{jk} > 0, p_k > 0, \forall k \in B_j, j \in \mathcal{D}$$

where B is a set of product types and $\mathcal{P}$ is the set of all products trading in the exchange, and $B_j \subset \mathcal{P}$, $j \in \mathcal{D}$, is the project-demand bundle, defined as an indivisible set of products that must be part of a micro-contract $\psi_j$. This set also is referred as a purchase basket for a given customer. $q_{jk}$, $k \in B_j$, is the quantity required at time $\tau_j$, and $p_k$ the corresponding price. Each of these elements in the set can be predicted or estimated from the data base $\Phi_t$ known at any time, thus ψ is a function of Φ and the time at which it is forecasted.

The timing, quantity, and product set in each project is also predicted from history of past projects, along the features inherent of each project. These signals can be detected early from filing permits, operator investment plans, and industrial projected activity, at some time much earlier than actual demand consumption τ.

The operator or buyer has the ability to split the demands, for instance to manage a large project, to ease procurement of specialized products, or to facilitate matching with suppliers. Therefore, if a given project can be split into subset of products that may be supplied by distinct suppliers, each subset will be reduced to distinct points in $\mathcal{D}$, and thus as a potential micro-contract to be matched to a supplier. It is possible, however, that the macro-project has some relationships between the multiple sub-projects and corresponding micro-contracts, such as demand times τ, in order to properly sequence delivery times of demand to avoid project disruptions.

Therefore, the set $\mathcal{D}$ is properly constructed with formal rules. For example, the strict non-split rule defines a single demand point with all products in one micro-contract (basket size per demand point is larger than one, i.e. |B|>1), while the full-split rule allows a micro-contract per single product type (basket size per demand point is larger than one, i.e. |B|=1). Finally, the buyer or operator may set any rule of partial splitting by grouping multiple products in various micro-contracts per project.

In an example of a demand and supply matching algorithm, operators act as agent buyers and award the order of products to a given supplier to deliver a set of products/services (material) required by the project. When the project is awarded to a supplier who commits to deliver according to requirements, a micro-contract is signed between supplier and operator through the exchange. Let:

$$x_{ij} = \begin{cases} 1, & \text{if stock location } i \in S \text{ is assigned to project } j \in \\ 0, & o.w. \end{cases}$$

Denote the assignment as 'matching' according to an optimization engine. The assignment $x_{ij}$ is searched in the engine so as to maximize the likelihood of a micro-contract between supplier $s_i \in S_V$ and an operator $b_j \in D_M$.

When a micro-contract j is assigned to a supply point i, managed by supplier $s_i$, the payoff is the net revenue generated by the transaction, minus associated costs, denoted by $$\pi_{ij}(\Psi_j) = \sum_{k \in B_j} p_k q_{jk} - c(i,j), \forall i \in S, j \in \mathcal{D}, \tag{1}$$

where $B_j$ is set of products required by demand $\psi_j$, $p_k$ is the price of product k, $q_{jk}$ is quantity of demand j of product k, and c(i,j) is the transaction cost to fulfill the order, including transportation cost between locations of supplier facility i and project location of j. The cost is proportional to some of the parameters in the requirements if project j such as total quantity (length, weight) of the product demanded, locality dependent, etc.

The match supply-demand is restricted by the operator's approval of the supplier. We denote as restriction, as follows, $\forall i \in S, \forall j \in \mathcal{D}$ $$a_{ij}^A = \begin{cases} 1, & \text{if supplier } s_i \in S_V \text{ is Approved by operator } b_j \in D_B \\ 0, & s_i \text{ is restricted by } b_j \end{cases} \tag{2}$$

Also, a natural constraint is the supplier ability to fulfill the project order requirements. Let:

$$a_{ij}^C = \begin{cases} 1, & \text{if location } i \in S, \text{ is Capable of fulfilling } reqs. \text{ of } j \in \mathcal{D} \\ 0, & o.w. \end{cases} \tag{3}$$

thus, the net constraint for a feasible match is to hold supplier approval and capability to fulfill an order to be both true:

$$a_{ij} = a_{ij}^A a_{ij}^C \tag{4}$$

The formulation in the example proposed method ensures that each assignment meets the requirements of the micro-contract, $\psi_j(\Phi) = \{\tau, B, q, p\}, j \in \mathcal{D}$, in terms of parameters $\{\tau, B, q\}$. In this example, the price is considered to be the market price to ensure market clearance, i.e. a feasible acceptance of matching trade at willingness price to buy/sell. However, the proposed method allows also price bidding used in the matching process to elicit the market price from multiple suppliers, depending on the desired implementation.

The inventory allocation quantity in each supply point in S is dynamically updated in the exchange by each supplier along its intention to trade, and he/she commits to deliver when a proper client is matched and sign on. At time t, define the inventory of a product k that supplier allocates in the supply point i for trading on the exchange, by $$I_{ik}(t) \geq 0, i \in S, k \in \mathcal{P} \tag{5}$$

where $\mathcal{P}$ is the set of all products trading in the exchange.

The supplier feasibility to be matched into one or more micro-contracts depends on the inventory allocation capacity to fulfill demand of all products in B, both in quantities q, and time τ, $t \leq \tau_j, \forall j, \psi_j$, of every micro-contract considered in the matching. Lets define a bundle of micro-contracts $\psi^b$, mapped to its demand points by $d(\psi^b) = \{j: \psi_j \in \psi^b, j \in \mathcal{D}\}$. The total demand of this bundle is $$y_k(\Psi^b) = \sum_{j \in d(\psi^b)} q_{jk}, \forall k \in \bigcup_{j \in d(\psi^b)} B_j, \tag{6}$$

Therefore, a supplier i is feasible to be matched with the bundle $\psi^b$ if it satisfies all the constraints $$I_{ik}(t) \geq y_k(\psi^b), t < \tau_j, \forall k \in \cup_{j \in d(\psi^b)} B_j \tag{7}$$

This constraint ensures that supplier i has enough allocation of inventory to fulfill obligations of the micro-contracts he can be matched with. Note that the right-hand side of the equation is the total demand of all products required by projects j in the set d(.).

Figure 6B:
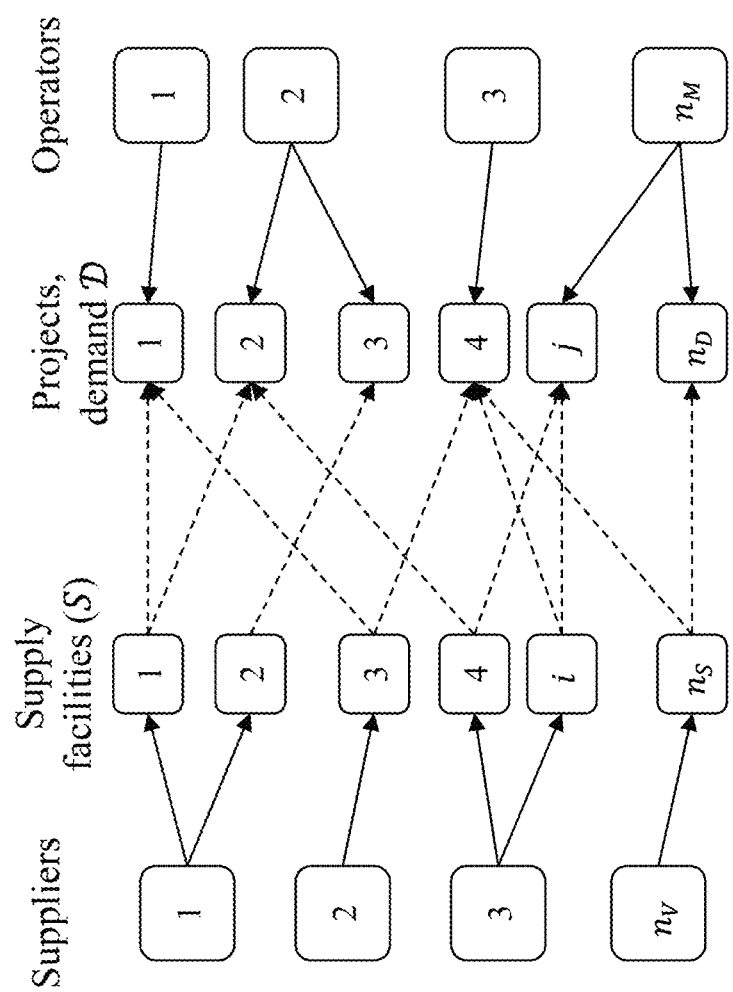
FIG. 6(b) illustrates an example of a bipartite graph.

The optimization problem can be configured/coded as a bipartite graph as illustrated in FIG. 6(b), which involves a collection of nodes and arcs:

$$G = (N, A) \tag{8}$$

properly defined by $N = S \cup \mathcal{D}$, a set of nodes and a set of arcs by $$A = \{(i,j): a_{ij} = 1, i \in S, j \in \mathcal{D}\} \tag{9}$$

where supply points are represented by the left nodes of a bipartite graph, denoted by i, and bundle of demand points by the right nodes, denoted by j. Supply points j (demand points i) are linked to suppliers (to operators) by the vectors $s_i(b_j)$ respectively, completing the formal definition of the graph of the micro-contract demand-supply matching problem. Clearly, the micro-contracts are mapped into the graph with $\psi_j, \forall j \in A$, and the supply inventories allocated $I_{ik}, \forall i \in A, \forall k \in \mathcal{P}$, hence the demand supply matching with micro-contracts problem is well defined.

When there is no restriction on suppliers from operators, a full bipartite graph is obtained in which every supply node is connected to any other project node.

The following optimization problem finds the best assignment between suppliers and operators that satisfy approvals and capacity constraints:

$$v(G) = \max_{x} \left\{ \sum_{i \in S} \sum_{j \in \mathcal{D}} x_{ij} \pi_{ij}(\Psi_j) \right\} \quad (10)$$

s.t. (11)

$x_{ij} \leq a_{ij}$ $x_{ij} \in \{0,1\}, \forall (i, j) \in G$ where $x \in \{0,1\}^{n_S \times n_D}$, $a_{ij}$ is computed by equations (2)-(4), $\pi_{ij}$ by equation (1), and the network graph G is built by (8).

The solution of the problem is simplified if the transaction cost is zero (c(i,j)=0) or independent of matching, then by relaxing integrality constraint in the formulation to $x_{ij} \geq 0$, the optimization can use a linear solver (LP solver, e.g. simplex algorithm). The solution will indicate the matching and demand fulfillment between suppliers and demands.

If the transaction cost is location and matching dependent, then the problem is NP-hard.

The optimization may use a generic Mix Integer Programming solver to find the optimal matching, or a standard branch and cut procedure to find the near optimal solution. The initial parameters of the problem are estimated with a pre-solver process by using most updated data available ($\Phi$). A greedy heuristic matching the supplier to most profitable micro-contract is also an easy alternative to find fast an initial matching: i.e. by using a sorting score method with nearest distance between supply point and project location, where distance is defined as transportation and transaction cost.

In an example implementation, this optimization is run at the beginning of every period with all open micro-contracts that are yet to be matched. The solution provided by the engine to the supply demand matching is the assignment x* such that it maximizes the payoff in the system.

$$x^* = \text{argmax } v(G_t) \quad (12)$$

where $G_t$ is the current state of the exchange denoting agents requiring a demand for a project, and suppliers allocating inventory to participate in the exchange.

The formulation is adjusted to ensure that each assignment meets requirements of the micro-contract, in terms of parameters $\{\tau, B, q\}$. That is, a supplier is feasible for matching if the inventory allocation contains products in B, at quantities q, at time $\tau$, according to requirements of project j.

Figure 7:
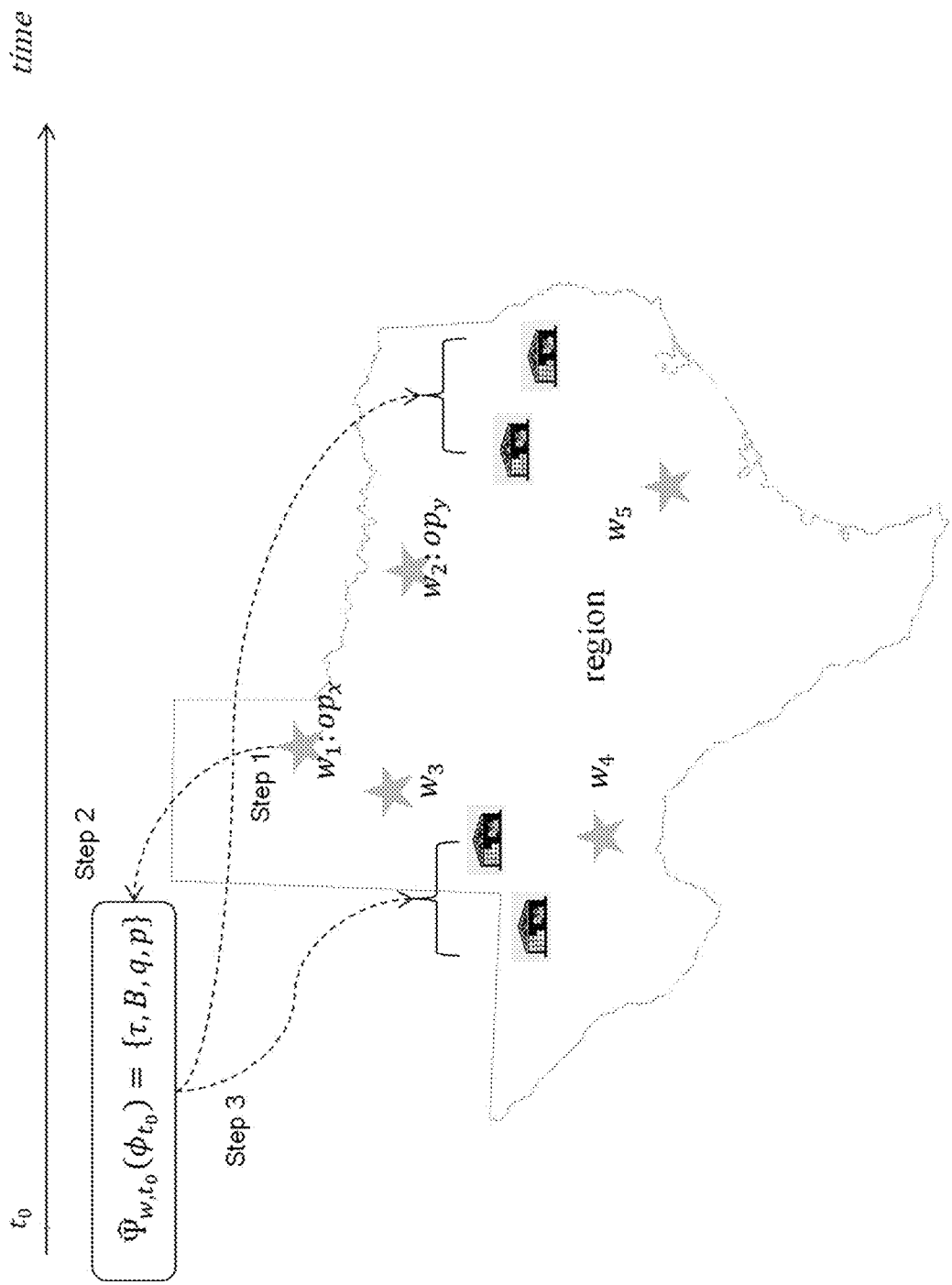
FIG. 7 illustrates an example sequence of events of the exchange, in accordance with an example implementation.

FIG. 7 illustrates an example sequence of events of the exchange, in accordance with an example implementation. Specifically, FIG. 7 illustrates several steps in accordance with an example implementation, from early prediction to closing micro-contract. The XCG platform attempts to anticipate demand with early signals. The example of FIG. 7 illustrates a timeline of a set of wells predicted from early signals $w_1$ to $w_5$ in example below (note in the algorithms below w is also d). These for example could be extracted from permits to drill wells by various operators, or construction projects permits for railway expansion, commercial buildings construction permits, etc. If the location is missing (e.g., sometimes permits are incomplete and later amended with additional information), then the platform produces the set of potential demands, still at intention based on project plans (w).

As illustrated in FIG. 7, at step 1, the XCG platform monitors signals from $\Phi$, and build New Demand set $\mathcal{D}$. Trigger micro-deal pursuit starts at $t_0$ if a project permit is detected, a project funding is reported, a project call-out is triggered, or so on. In the example of FIG. 7, a project permit is detected. At step 2, the XCG platform predicts early demand bundle $\hat{\psi}_w$ for every project in $w \in \mathcal{D}$, using $\Phi$. At step 3/ the XCG platform presents offering $\hat{\psi}_w$ to potential vendors, which can involve the XCG platform calculating best matching (pre-select) set of suppliers with best to operator matchings preferences.

Figure 8:
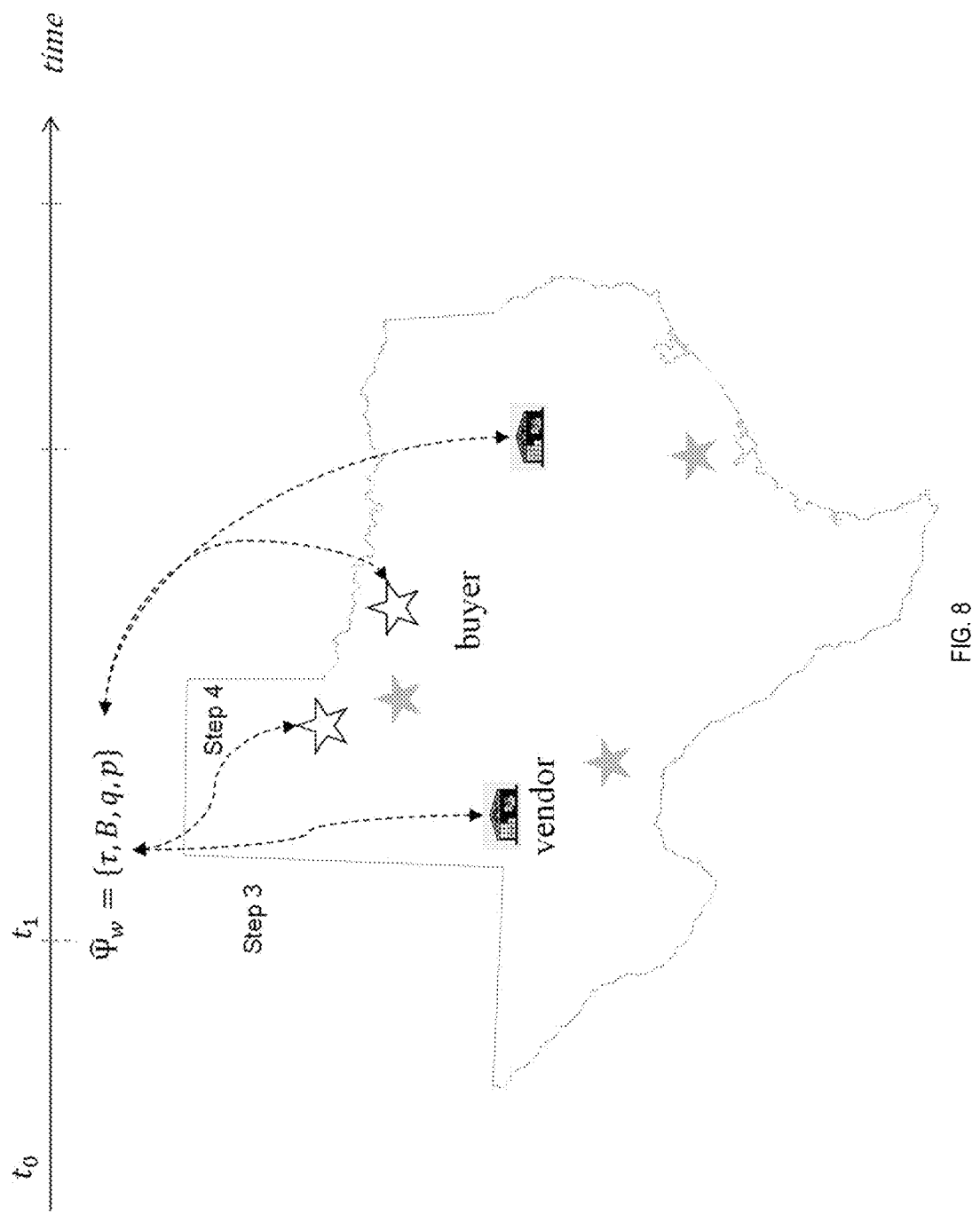
FIG. 8 illustrates an example flow for matching and locking the seller-buyer with the XCG platform, in accordance with an example implementation.

FIG. 8 illustrates an example flow for matching and locking the seller-buyer with the XCG platform, in accordance with an example implementation. In a continuance of step 3 from FIG. 7, if multiple suppliers bid as illustrated in FIG. 8, the XCG platform takes the best bid to operator that maximizes matching rewards. At step 4, the XCG platform conducts a micro-contract and matching handshake with the operator.

Figure 9:
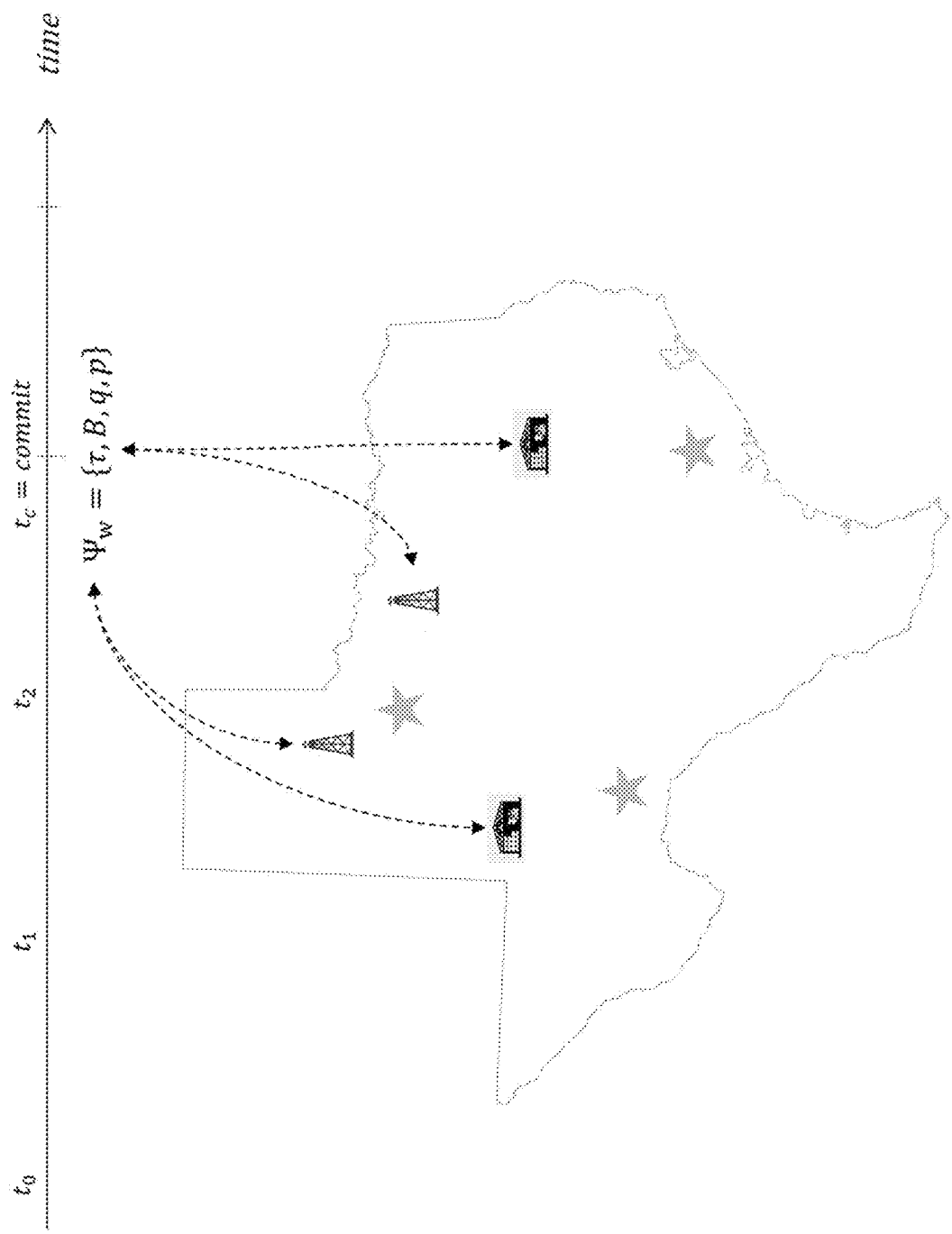
FIG. 9 illustrates an example of committing demand and closing the micro-contract through the platform, in accordance with an example implementation.

FIG. 9 illustrates an example of committing demand and closing the micro-contract through the platform, in accordance with an example implementation. Once the handshaking of FIG. 8 is completed, the suppliers $S_1$ and $S_4$ commit to the demand required from the operators Op x and Op y at time $t_c$, whereupon the micro-contract is thereby executed and closed.

Figure 10:
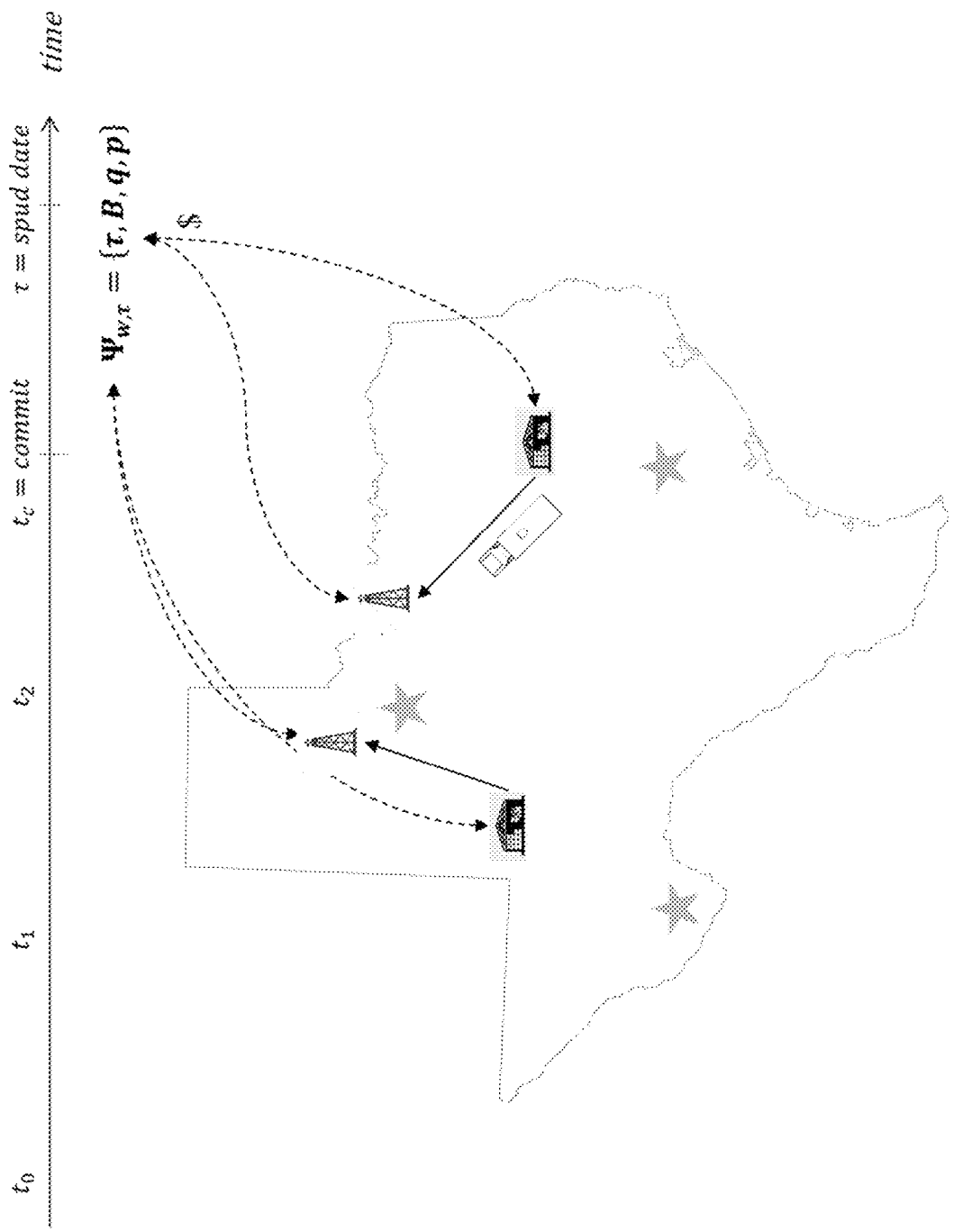
FIG. 10 illustrates an example of the end of cycle as facilitated by the platform, in accordance with an example implementation.

FIG. 10 illustrates an example of the end of cycle as facilitated by the platform, in accordance with an example implementation. At the spud date time, the platform facilitates the execution of order fulfillment with one or more suppliers as needed, automates the payments and ends the micro-contract.

Figure 11:
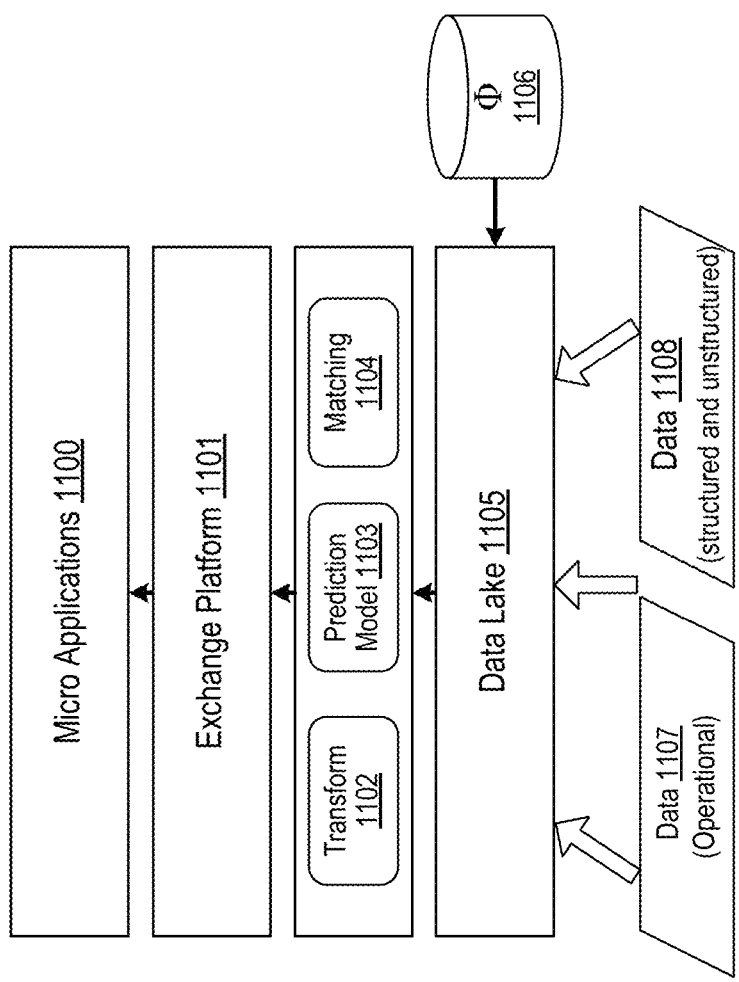
FIG. 11 illustrates an example system diagram upon which example implementations may be facilitated.

FIG. 11 illustrates an example system diagram upon which example implementations may be facilitated. The system involves a data lake 1105 that is configured to receive operational data 1107 as well as structured/unstructured data 1108 related to impending demand for a project. Early signals $\Phi$ (i.e the Big Data collected) 1106 associated with past micro-contracts are utilized to conduct analytics to generate the transform function 1102, the prediction model 1103, and the matching function 1104. The functions facilitate the overall exchange platform 1101 on the cloud, which can be configured to determine micro applications 1100 and generate micro-contracts to the corresponding entities.

Figure 12:
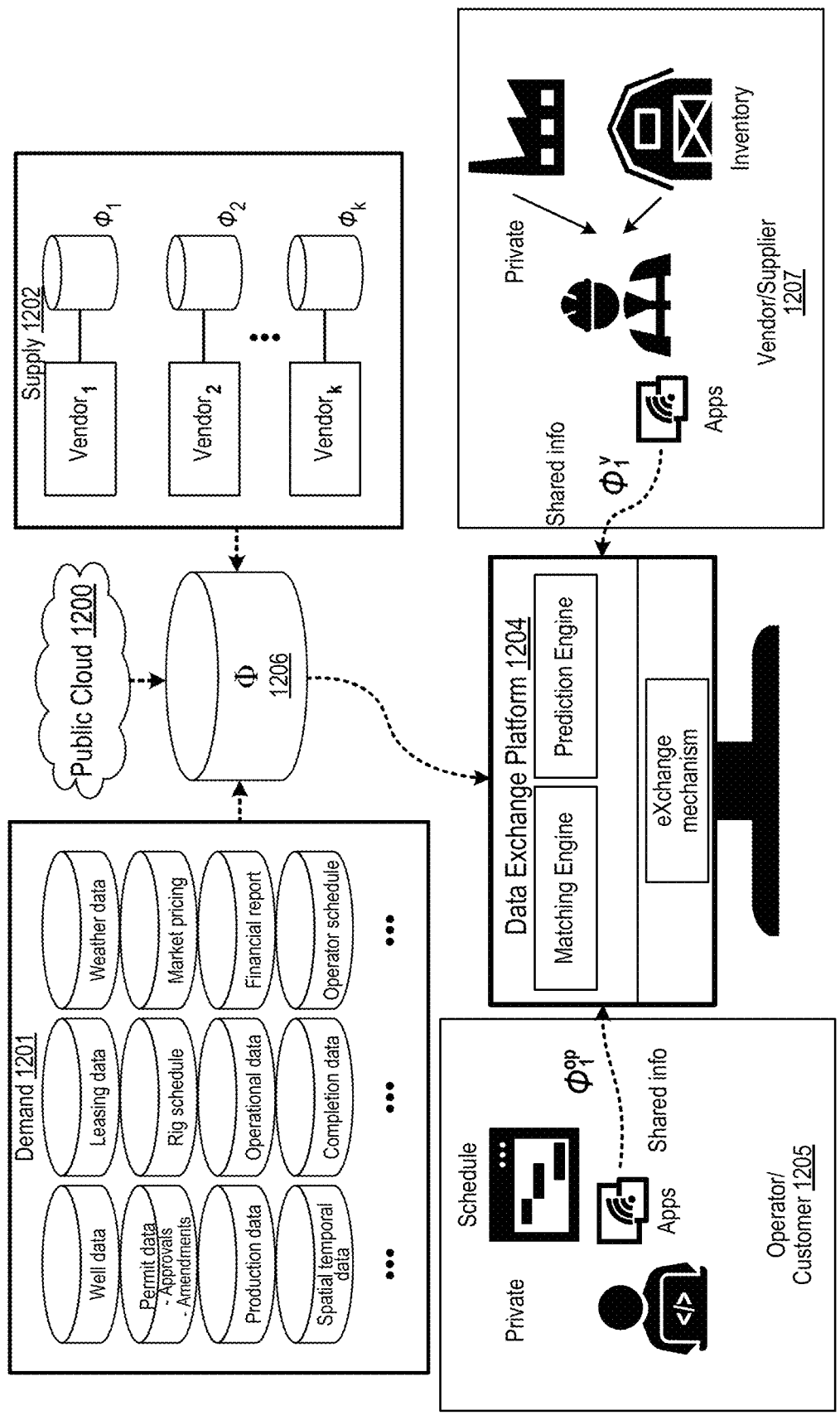
FIG. 12 illustrates an example of the entities interacting with the data exchange platform and system, in accordance with an example implementation.

FIG. 12 illustrates an example of the entities interacting with the data exchange platform and system, in accordance with an example implementation. As illustrated in FIG. 12, a collection of early signals $\Phi$ 1206 is managed on a public cloud 1200. The early signals 1206 can be provided with supplier information from one or more vendors on the supply side 1202 which can include applicable information in their corresponding databases in accordance with the desired implementation. Additional signals can be provided from the demand side 1201 which involves the operator information for the operators managed by the platform. Such operator information can include, but is not limited to, well data, leasing data, weather data, permit data (e.g., approvals of permits, amendments to permits), rig schedule, market pricing, production data, operational data, financial reports, spatial temporal data, completion data, and the operator schedule. The data exchange platform 1204 utilizes the early signals 1206 as described in example implementations herein to conduct contract prediction with a prediction engine and matching procedures to match operators 1205 with suppliers 1207 in accordance with the implementations described herein.

Figure 13:
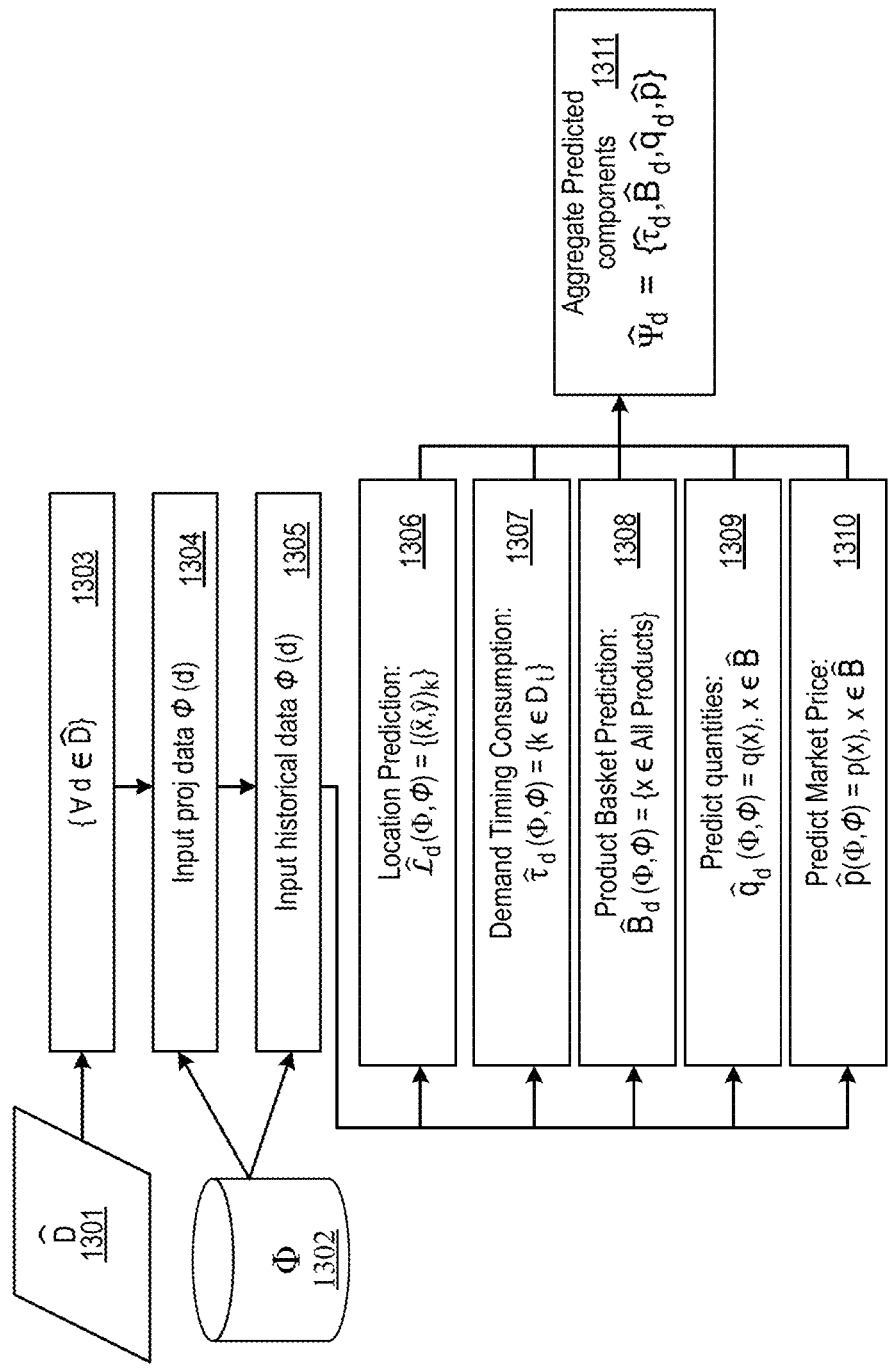
FIG. 13 illustrates an example demand prediction architecture, in accordance with an example implementation.
Figure 14:
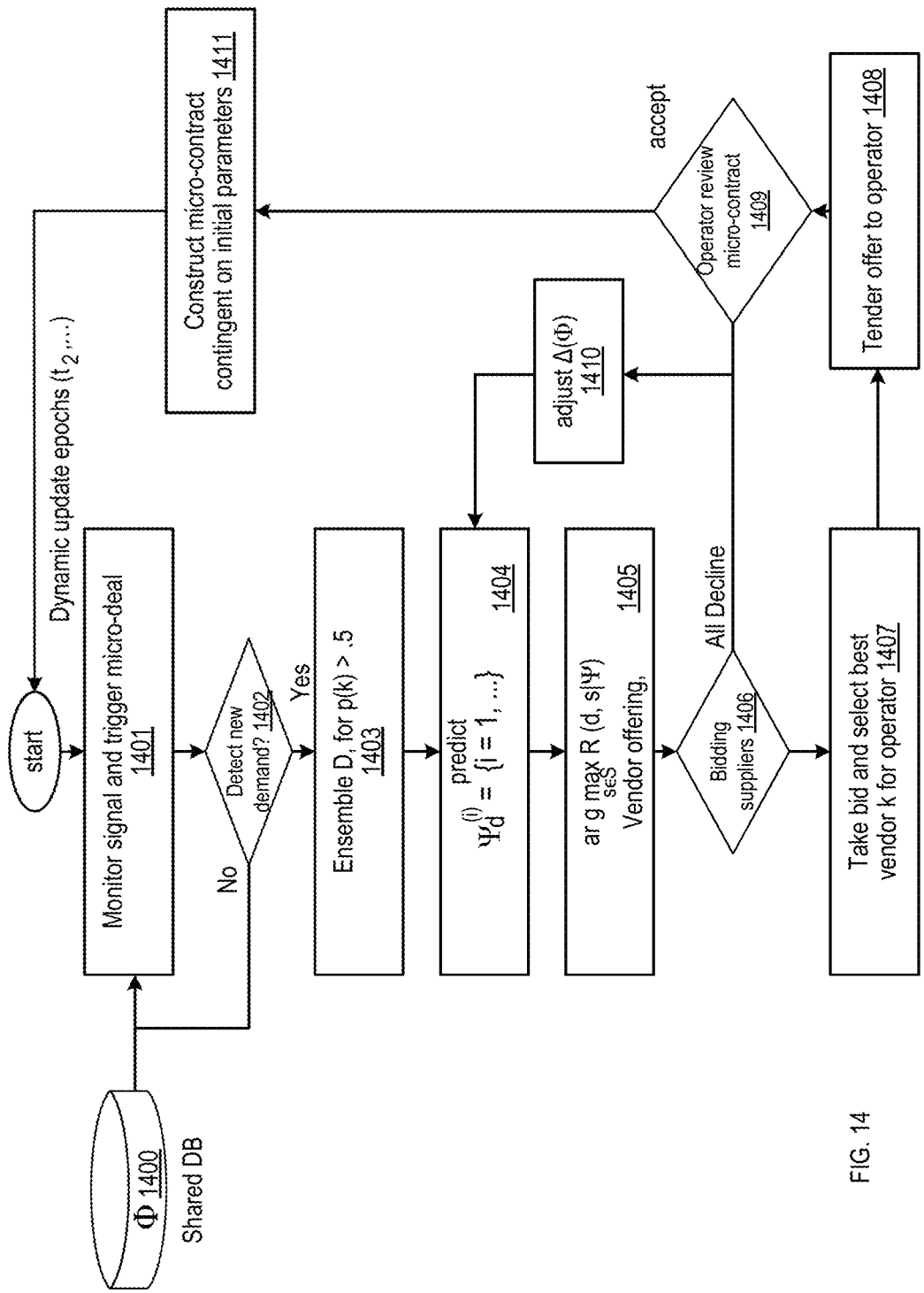
FIG. 14 illustrates an example flow diagram for facilitating the generation and tendering of a micro-contract through the exchange platform, in accordance with an example implementation.

In example implementations as will be illustrated in FIGS. 13 and 14, there is the continuous monitoring of well data info (permits, leasing, financial reports, . . . ) which can be derived from the demand 1201. An offering or bundle predicted by the engine can thereby be tied to project w (well id), wherein characteristics of the bundle predicted by the engine includes next variables. Information that can be derived from the analytics can include well location (from permit is known, or from engine is predicted when missing based on historical information), basket of products B, and quantities of each product in B, expected spud date, and price range for deal buying selling per product, at quantity specified, which reflects the price that is acceptable for buyers and sellers.

In example implementations, the predictions are updated (at $t_0, t_1, t_2, t_3, \ldots$) as the information is updated the parameters of the bundle become more accurate. At commitment point, the variables are finalized and the micro-contract is executed.

Through the platform, the operators input preferences, (features, pricing, quantities, location, operators, and so on) and the vendors input preferences (features, target margins, locations, availability, and so on) can be entered through the application and provided to the data exchange platform 1204. The application (app) is available for both buyers and sellers to trigger potential bidding, which can include an offer to fulfill demand by yard to an operator, a permit filed, a construction plan, and so on. The data exchange platform 1204 tracks final requirements to fulfill orders at agreed upon times and enforces XCG payments and shares profits with all agents involved.

As illustrated in FIG. 12, the operator 1205 and vendor/supplier 1207 each have a corresponding app that allows them to communicate information over a network to the data exchange platform 1204, which allows vendors to engage with a matching-operator who files a permit (potential job) based on a probabilistic match. Through the example implementations described herein, the platform 1204 generates offers to operators and vendors to match service w, conducts a handshake to operator opr to offer service w based on the filed permit, conducts a handshake with vendor vdr to supply service w, utilizes analytics to read filing/intent of well w and produces $\psi_0(w)$ with available data for w, at time of filing t=0, utilizes analytics/optimization to match best pair (vendor, operator) to fulfill demand and supply at best economic transaction, and engages the payment processors to cover a sell/buy transaction through distributing sales revenue to sellers and extracting revenue from buyers.

FIG. 13 illustrates an example demand prediction architecture, in accordance with an example implementation. The set of demands $\mathcal{D}$ 1301 as determined from the early signals detected from the early signals database 1302 is provided, for which demand set d is considered based on the managed customers and vendors. From the early signals database 1302, the project data 1303 and the historical data 1304 for the demand set is obtained from the early signals database. As described herein, the early signals information for the demand set from the project data 1304 and the historical data 1305 are utilized to conduct location prediction 1306, demand timing consumption 1307, product basket prediction 1308, quantity prediction 1309 and market price prediction 1310, which are aggregated to provide an overall prediction at 1311.

FIG. 14 illustrates an example flow diagram for facilitating the generation and tendering of a micro-contract through the exchange platform, in accordance with an example implementation. At 1401, a process is initialized to monitor signals from the early signals database 1400 for a micro-deal trigger. At 1402 a determination is made as to whether such a micro-deal has been detected. If so (Yes), the flow proceeds to 1403, otherwise (No) the flow proceeds back to 1401.

At 1403 the demand set is ensembled when the probability that a new demand has been triggered exceeds a threshold (in this example, 0.5). At 1404, the aggregated predictions are generated for the ensemble demand set through execution of the process illustrated in FIG. 13. At 1405, a vendor offering is constructed on behalf of a managed operator based on the maximized values for both the demand set and the vendors. At 1406, the vendor offering is presented to the bidding suppliers. If the bidding suppliers decline (All decline) then the process proceeds to 1410 to adjust $\Delta(\Phi)$, and re-optimize $\hat{\psi}$ to satisfy new constraints. The process is iterated until a subset of the bidding suppliers accept the vendor offering, whereby the process proceeds to 1407.

At 1407, the bids are received whereupon the best vendor from the subset of bidding suppliers is selected for the operator. At 1408, the offer is generated for the operator to review in the form of a micro-contract. At 1409, the operator determines whether the micro-contract is to be accepted or not. If declined, then the process proceeds back to 1410, otherwise (accept), the process proceeds to 1411 to construct the micro-contract contingent on the initial parameters determined in the demand set. Through this process, a micro-contract is created and signed and the operator and bidding suppliers can enter into an anticipated micro-contract before the project has begun. Once the micro-contract is thus executed, payment processors can be automatically instructed to facilitate the corresponding payments from the operator.

As described herein, the example implementations facilitate a methodology of an exchange system to drive a market place of distribution of products in oil and gas with an anticipative demand mechanism. Example implementations can thereby setup a process to micro-contract granular demand (e.g. wells drilling projects) in bidding offers between sellers (pipe sellers) and buyers (drilling operators) to be matched.

In the example implementations described herein, there is a method to flag early demand signals from financial reports (land lease, project permits, etc.) and other demand 'intent' signals to generate potential demand as illustrated in FIGS. 12-14.

In the example implementations described herein, there is a method to anticipate demand distribution process while reducing uncertainty through sequential signals in dynamic prediction updates, transforming planning process from highly aggregated to granular demand, from reactive to anticipative, from slow and large contracting commitments to smaller and faster micro-contract process as illustrated in FIGS. 12-14.

In example implementations, an Exchange (XCG) mechanism as illustrated in FIGS. 4(b) 11, and 12 generates a process to achieve handshake of contract agreements between sellers (supplier) to buyers (operators) as early as possible, simplifying the transaction process. A set of methods in the XCG mechanism are utilized in example implementations to generate an earlier demand requirements (e.g. from well drilling) and to build the micro-contract (when, where, what, quantity, price) as illustrated in FIGS. 5-14, and facilitate a supply-demand matching method in the XCG mechanism to complete the deal as illustrated in FIG. 14. Depending on the desired implementation, the XCG matching process between buyers and sellers is triggered both on anticipative manner and on call out basis as illustrated in FIG. 14.

Example implementations described herein also facilitate a demand-offering prediction (triggering process) as illustrated in FIG. 13. This method has early signals in $\Phi$ (i.e the Big Data collected) to construct the offering set. The example implementations utilize an algorithm to trigger an early prediction of potential demand, $\psi_{new}(\Phi)=\{\tau, q, B, p\}$, which is utilized as an abstraction of potential demand bundle. In an example implementation there is an algorithm to Predict project start (spud date), when will demand be consumed, an algorithm to Predict main indicators of demand (total depth of future well, x), and an algorithm to Predict product set of demand (q(x), B (x) products and service requirements) as illustrated in FIGS. 5-10.

In example implementations, there is a matching algorithm for demand and supply as illustrated in FIGS. 7-9. The matching algorithms can predict the pairs of buyer-seller (including attach services providers, if required) to the potential demand predicted in step of "Demand-offering prediction". Such example implementations also facilitate utility maximization to predict price, location of seller willing to match, as well as consider meeting constraints based on preferences, including location, inventory, sales history (available in the XCG) and so on.

As illustrated in FIG. 12, depending on the desired implementation, the platform is implemented over a network wherein device applications manage the interaction between vendors and operators. Such applications can facilitate transactions for product services, transportation as well as system management (e.g., for subscriptions, data streams, and so on).

In example implementations, any machine learning methods or other analytics can be utilized in accordance with the desired implementation. Such machine learning methods or analytics can be implemented for continuous monitoring of datasets, well permits data from public sources or syndicated, historical sales, and economic external data inputs applied to prediction and optimization. As illustrated in FIG. 13, example implementations facilitate the integration and connection of such algorithms to achieve demand-supply matching, which can include matching algorithms to find optimal pairing between operators and future wells to vendors who satisfy preferences and economic incentives driving pricing and bidding into successful deal and micro-contract's "Handshake" or micro-deal of a successful match. It translates predicted bundle into close deal and can automate pay transfers at closing Example implementations thereby facilitate a market place to replace intermediaries between sellers and buyers in a supply chain of products and services. Such example implementations can be applied in industries such as oil and gas well drilling constructions, industrial construction projects, public and private construction, and so on. This marketplace would represent a disruption in distribution of such products and services. A logical question is to whether operators would prefer to participate in this new market environment. Since such processes not only simplify their planning, procurement, and bargaining prices, operators would be enticed to participate. Vendors can receive early information and avoid pitfalls of stocking large amount of inventories which would be under pressure to sell. As such, the new market place reduces risks to both sellers and buyers, making a strong case that both would be enticed to participate and make the exchange the place to procure materials needed to completed projects. Example implementations also leverage prediction methodologies utilizing big data to anticipate and demand, and when and how much would be required, through early demand signals and historical data that would enable training such prediction models. Example implementations also determine the timing to produce timed prediction that would trigger a micro-contract deal with our demand-supply matching engine.

Figure 15:
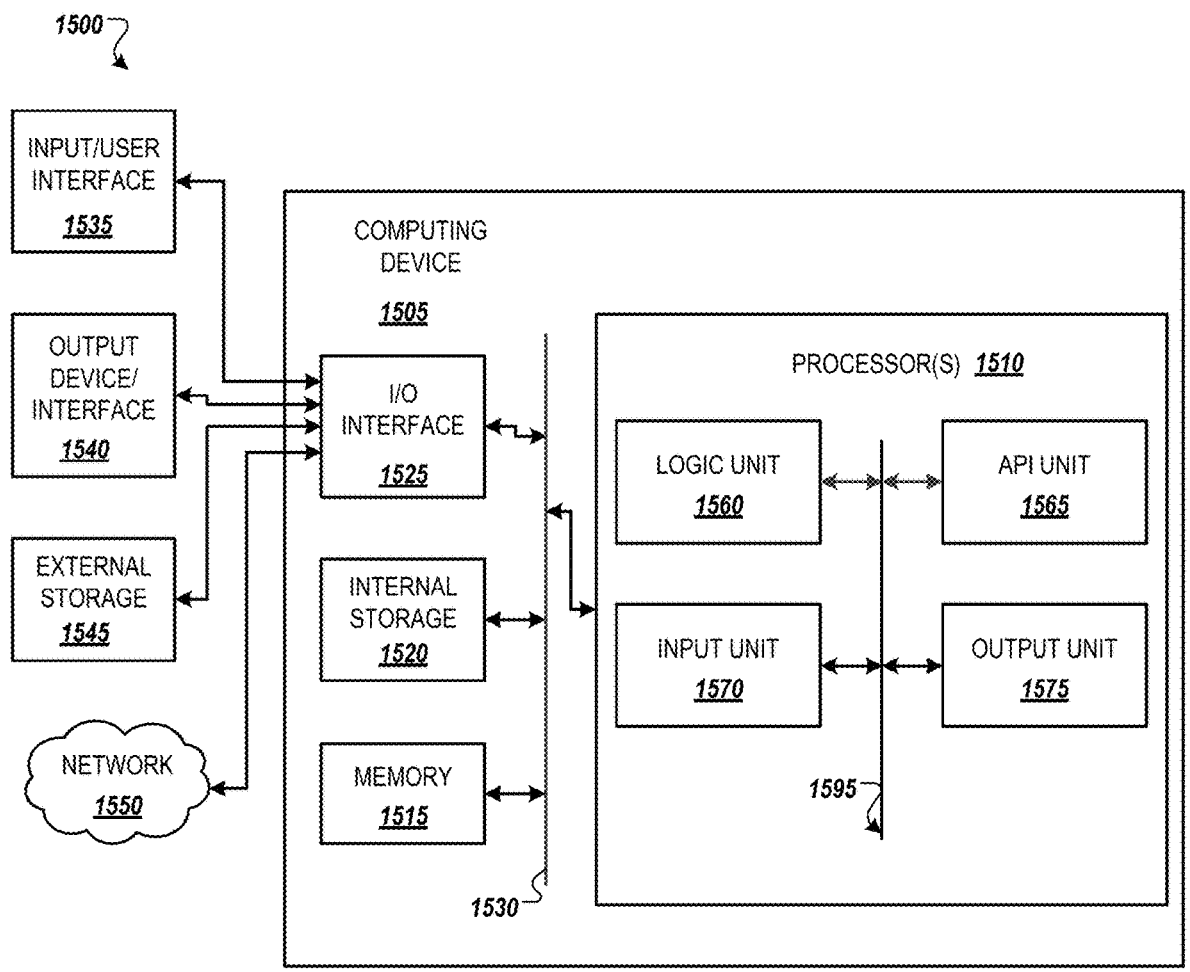
FIG. 15 illustrates an example computing environment with an example computer device suitable for use in some example implementations.

FIG. 15 illustrates an example computing environment with an example computer device suitable for use in some example implementations, such as for facilitating data exchange platform 1204. Computer device 1505 in computing environment 1500 can include one or more processing units, cores, or processors 1510, memory 1515 (e.g., RAM, ROM, and/or the like), internal storage 1520 (e.g., magnetic, optical, solid state storage, and/or organic), and/or I/O interface 1525, any of which can be coupled on a communication mechanism or bus 1530 for communicating information or embedded in the computer device 1505. I/O interface 1525 is also configured to receive images from cameras or provide images to projectors or displays, depending on the desired implementation.

Computer device 1505 can be communicatively coupled to input/user interface 1535 and output device/interface 1540. Either one or both of input/user interface 1535 and output device/interface 1540 can be a wired or wireless interface and can be detachable. Input/user interface 1535 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 1540 may include a display, television, monitor, printer, speaker, braille, or the like. In some example implementations, input/user interface 1535 and output device/interface 1540 can be embedded with or physically coupled to the computer device 1505. In other example implementations, other computer devices may function as or provide the functions of input/user interface 1535 and output device/interface 1540 for a computer device 1505.

Examples of computer device 1505 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 1505 can be communicatively coupled (e.g., via I/O interface 1525) to external storage 1545 and network 1550 for communicating with any number of networked components, devices, and systems, including one or more computer devices of the same or different configuration. Computer device 1505 or any connected computer device can be functioning as, providing services of, or referred to as a server, client, thin server, general machine, special-purpose machine, or another label.

I/O interface 1525 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 1500. Network 1550 can be any network or combination of networks (e.g., the Internet, local area network, wide area network, a telephonic network, a cellular network, satellite network, and the like).

Computer device 1505 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computer device 1505 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 1510 can execute under any operating system (OS) (not shown), in a native or virtual environment. One or more applications can be deployed that include logic unit 1560, application programming interface (API) unit 1565, input unit 1570, output unit 1575, and inter-unit communication mechanism 1595 for the different units to communicate with each other, with the OS, and with other applications (not shown). The described units and elements can be varied in design, function, configuration, or implementation and are not limited to the descriptions provided. Processor(s) 1510 can be in the form of hardware processors such as central processing units (CPUs) or in a combination of hardware and software processors.

In some example implementations, when information or an execution instruction is received by API unit 1565, it may be communicated to one or more other units (e.g., logic unit 1560, input unit 1570, output unit 1575). In some instances, logic unit 1560 may be configured to control the information flow among the units and direct the services provided by API unit 1565, input unit 1570, output unit 1575, in some example implementations described above. For example, the flow of one or more processes or implementations may be controlled by logic unit 1560 alone or in conjunction with API unit 1565. The input unit 1570 may be configured to obtain input for the calculations described in the example implementations, and the output unit 1575 may be configured to provide output based on the calculations described in example implementations.

Processor(s) 1510 can be configured to monitor a database involving supplier information associated with one or more suppliers and operator information associated with an operator until a trigger is detected, the trigger indicative of a prediction that a demand for a micro-contract for the operator exceeds a threshold as illustrated at FIG. 12 and 1401-1403 of FIG. 14; generate predictions of parameters of the micro-contract for transmission to the one or more suppliers over a network as illustrated in FIG. 13 and 1404 of FIG. 14; for an acceptance received from at least a subset of the one or more suppliers, select a supplier from the subset of the one or more suppliers, and generating the micro-contract for the operator from the parameters as illustrated at 1405-1408 of FIG. 14; and for an acceptance received from the operator over the network, execute the micro-contract between the operator and the seller as illustrated at 1409 and 1411 of FIG. 14.

Processor(s) 1510 can be configured to, for the acceptance not received from at least the subset of the one or more suppliers or for the acceptance not received from the operator, modify the predictions of the parameters of the micro-contract and transmit the modified parameters of the micro-contract to the one or more suppliers over the network as illustrated at 1406, 1409, and 1410 of FIG. 14. As described herein, the trigger can involve detecting a filing of a permit from the operator information.

Processor(s) 1510 can be further configured to select the one or more suppliers based on inventory determined from the supplier information as described in FIGS. 7-9. Further, parameters can involve well location, products to be delivered, expected spud date, and price range as described herein. Depending on the desired implementation, the predictions of the parameters are generated based on historical project data from the operator information and the operator information associated with the trigger as illustrated in FIG. 13.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A computer-implemented method for monitoring and matching supply and demand of required products for a well constructing project, the method comprising:
    receiving operational data at the well and structured and unstructured data related to impending demand for the well construction project;
    crawling web-data syndicated data sources, for big data managed on a public cloud system comprising location and inventory information for a plurality of suppliers offering the required products for every period of time in a time interval, and demand information from a drilling operator for the required products based on well data, weather data, permit data, rigs schedule, spatial temporal data, completion data and a schedule of the drilling operator;
    training prediction models using the big data to anticipate the demand information;
    monitoring, through a platform implementing a machine learning algorithm, a database comprising the inventory information associated with the plurality of suppliers and the demand information associated with the drilling operator to detect a trigger indicating a prediction that a demand for a micro-contract for the drilling operator exceeds a prediction threshold in filing a permit associated with the constructing of the well;
    detecting from the big data, early signals indicative of oil exploration, land leasing and construction permits to predict, using the trained prediction models and the detected trigger, a spud date when drilling the well will begin and the demand information comprising the required products for constructing the well and a total depth of the well;
    defining an optimization problem by coding a bipartite graph with vector linked nodes and arcs representing the demand information, the location, and the inventory information for the micro-contract;
    solving the optimization problem, by iteratively running a mix integer programming algorithm for every period of time until the micro-contract matching identifies a best one of the plurality of suppliers to the drilling operator;
    executing the micro-contract upon acceptance of the matching received from the drilling operator over a computer network.

2. The method of claim 1:
    updating the trained prediction models prior to executing the micro-contract.

3. The method of claim 1, wherein the prediction models are trained based on historical project data from the demand information and information associated with the detected trigger.

4. A system for monitoring and matching supply and demand of required products for a well constructing project, the system comprising one or more hardware processors configured to:
    receive operational data at the well and structured and unstructured data related to impending demand for the well construction project;
    crawl web-data syndicated data sources, for big data managed on a public cloud system comprising location and inventory information for a plurality of suppliers offering the required products for every period of time in a time interval, and demand information from a drilling operator for the required products based on well data, weather data, permit data, rigs schedule, spatial temporal data, completion data and a schedule of the drilling operator;
    train prediction models using the big data to anticipate the demand information;
    monitor, through a platform implementing a machine learning algorithm, a database comprising the inventory information associated with the plurality of suppliers and the demand information associated with the drilling operator to detect a trigger indicating a prediction that a demand for a micro-contract for the drilling operator exceeds a prediction threshold in filing a permit associated with the constructing of the well;
    detect from the big data, early signals indicative of oil exploration, land leasing and construction permits to predict, using the trained prediction models and the detected trigger, a spud date when drilling the well will begin and the demand information comprising the required products for constructing the well and a total depth of the well;
    define an optimization problem by coding a bipartite graph with vector linked nodes and arcs representing the demand information, the location, and the inventory information for the micro-contract;
    solve the optimization problem, by iteratively running a mix integer programming algorithm for every period of time until the micro-contract matching identifies a best one of the plurality of suppliers to the drilling operator;
    execute the micro-contract upon acceptance of the matching received from the drilling operator over a computer network.

5. The system of claim 4, wherein the one or more hardware processors are further configured to:
    update the trained prediction models prior to executing the micro-contract.

6. The system of claim 4, wherein the one or more hardware processors are further configured to:
    train the prediction models based on historical project data from the drilling operator information and information associated with the detected trigger.

7. A non-transitory computer readable medium for monitoring and matching supply and demand of required products for a well constructing project, the non-transitory computer readable medium comprising instructions executed by one or more hardware processors to:

receive operational data at the well and structured and unstructured data related to impending demand for the well construction project;

crawl web-data syndicated data sources, for big data managed on a public cloud system comprising location and inventory information for a plurality of suppliers offering the required products for every period of time in a time interval, and demand information from a drilling operator for the required products based on well data, weather data, permit data, rigs schedule, spatial temporal data, completion data and a schedule of the drilling operator;

train prediction models using the big data to anticipate the demand information;

monitor, through a platform implementing a machine learning algorithm, a database comprising the inventory information associated with the plurality of suppliers and the demand information associated with the drilling operator to detect a trigger indicating a prediction that a demand for a micro-contract for the drilling operator exceeds a prediction threshold in filing a permit associated with the constructing of the well;

detect from the big data, early signals indicative of oil exploration, land leasing and construction permits to predict, using the trained prediction models and the detected trigger, a spud date when drilling the well will begin and the demand information comprising the required products for constructing the well and a total depth of the well;

define an optimization problem by coding a bipartite graph with vector linked nodes and arcs representing the demand information, the location, and the inventory information for the micro-contract;

solve the optimization problem, by iteratively running a mix integer programming algorithm for every period of time until the micro-contract matching identifies a best one of the plurality of suppliers to the drilling operator;

execute the micro-contract upon acceptance of the matching received from the drilling operator over a computer network.

8. The non-transitory computer readable medium of claim 7, wherein the instructions, are further executed by the one or more hardware processors, to:

update the trained prediction models prior to executing the micro-contract.

9. The non-transitory computer readable medium of claim 7, wherein the instructions, are further executed, by the one or more hardware processors, to:

train the prediction models based on historical project data from the demand information and information associated with the detected trigger.

* * * * *